March 25, 1952 H. B. COXHEAD 2,590,234

AUTOMATIC SELECTION OF RECEIVING CHANNELS

Filed March 30, 1948 2 SHEETS—SHEET 1

INVENTOR
H. B. COXHEAD
BY
Robert J. Fluskey
ATTORNEY

March 25, 1952 H. B. COXHEAD 2,590,234
AUTOMATIC SELECTION OF RECEIVING CHANNELS
Filed March 30, 1948 2 SHEETS—SHEET 2

INVENTOR
H. B. COXHEAD
BY
Robert J. Pluskey
ATTORNEY

Patented Mar. 25, 1952 2,590,234

UNITED STATES PATENT OFFICE 2,590,234

AUTOMATIC SELECTION OF RECEIVING CHANNELS

Harry B. Coxhead, Plainfield, N. J., assignor to Bell Telephone Laboratories, Incorporated, New York, N. Y., a corporation of New York Application March 30, 1948, Serial No. 17,917

8 Claims. (Cl. 250—20)

Figure 1:
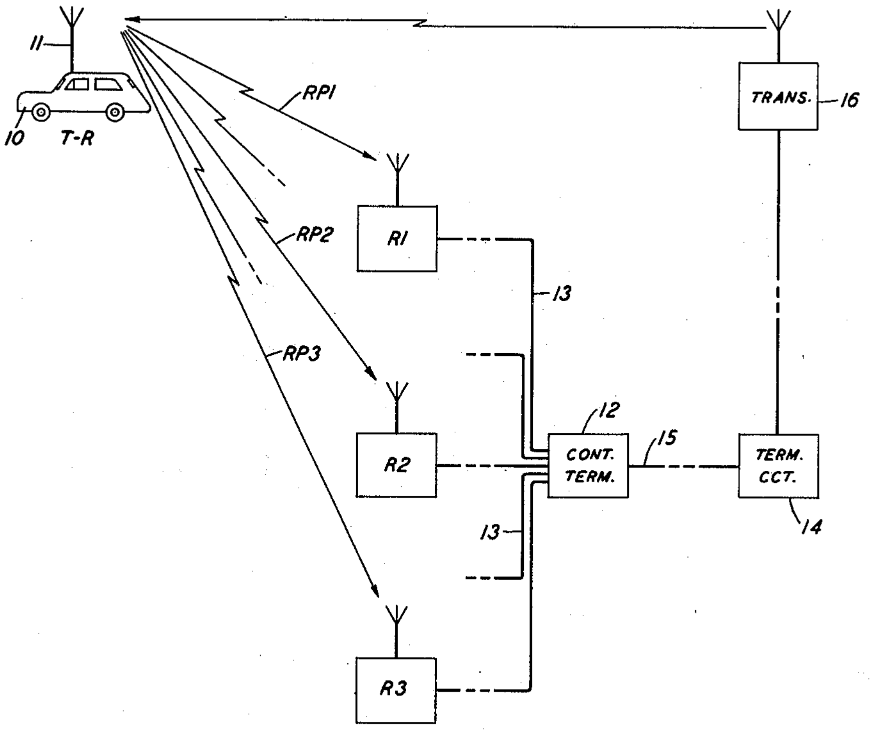

This invention relates to communication systems and more particularly to radio telephone systems for interconnecting mobile radio stations with one another or with a radio station or telephone subscriber at a stationary or fixed position location. More specifically, the invention relates to a diversity receiving system and to arrangements for more effectively utilizing the signal reception in such a system.

Communication systems are known in which a mobile radio station is adapted to be connected with a subscriber of a conventional telephone system or with other mobile radio stations through the intermediary of an operator at a land station, which operator may be the toll switchboard operator in a conventional telephone system. The mobile station itself may depend for its mobility upon any suitable vehicle, for example a watercraft, a vehicle such as a train operating along a fixed route, or a vehicle such as an automobile operating along specific highways or engaged in movement within a generally specified area, or a vehicle such as an aircraft. The radio station on the vehicle generally includes both transmitting and receiving equipment and, in order to keep the size of the equipment within the limits of the space available, the equipment, and particularly the transmitting equipment, is generally of low power. In known systems, several radio receivers have been located at separated geographical intervals along the route or within the area of travel of the mobile station so that more than one receiving station will be available to pick up the signals radiated by the mobile station, an appropriate receiver, or a suitable combination of two or more receivers is utilized for picking up the signals and transmitting them to the terminal circuit, for example, the telephone switchboard for appropriate action by the operator.

In a system of this kind, the outputs of all receivers are usually brought to a central station and are either bridged together to form a combined receiving circuit, or are provided with manual switching means to permit a technical attendant to select the most suitable receiver, or combination of receivers, for use during each message interval. Such critical attendance to system operations is not only costly but inherently results in a relatively slow speed of service and circuit transmission performance penalties. Improvements of these conditions are desired.

An object of the invention is to improve the signal intelligence receivable over a plurality of transmission paths, for example, including radio receivers, in a diversity receiving system, by automatically selecting or combining the signal contributions of such receivers received over respective transmission paths and transmitting the selected or resultant signal intelligence over a single or common transmission path to a circuit terminating position.

Another object of the invention is to provide a simple selecting means using a relatively small number of circuit components for enabling automatic selection among a plurality of receiving circuits for the same received signal, of the first of said circuits evidencing an acceptable signal for transmission to a circuit terminating position, and the automatic lock-out of the non-selected circuit or circuits.

Still another object of the invention is the provision of relatively simple manually adjustable means in a diversity receiving system for the selection or rejection of any one, some or all of the signal transmission paths from the receivers of the system, if and when special circumstances in the operation of the system render it desirable to do so.

A further object of the invention is to provide suitable visual or other signals at a control terminal or station for the diversity receiving system utilizing a minimum number of visual signals to furnish supervisory information as to which receivers are responding to the signal transmission incoming thereto, which receivers have been automatically selected at the moment, and which receivers are available for selection or combining.

Figure 2:
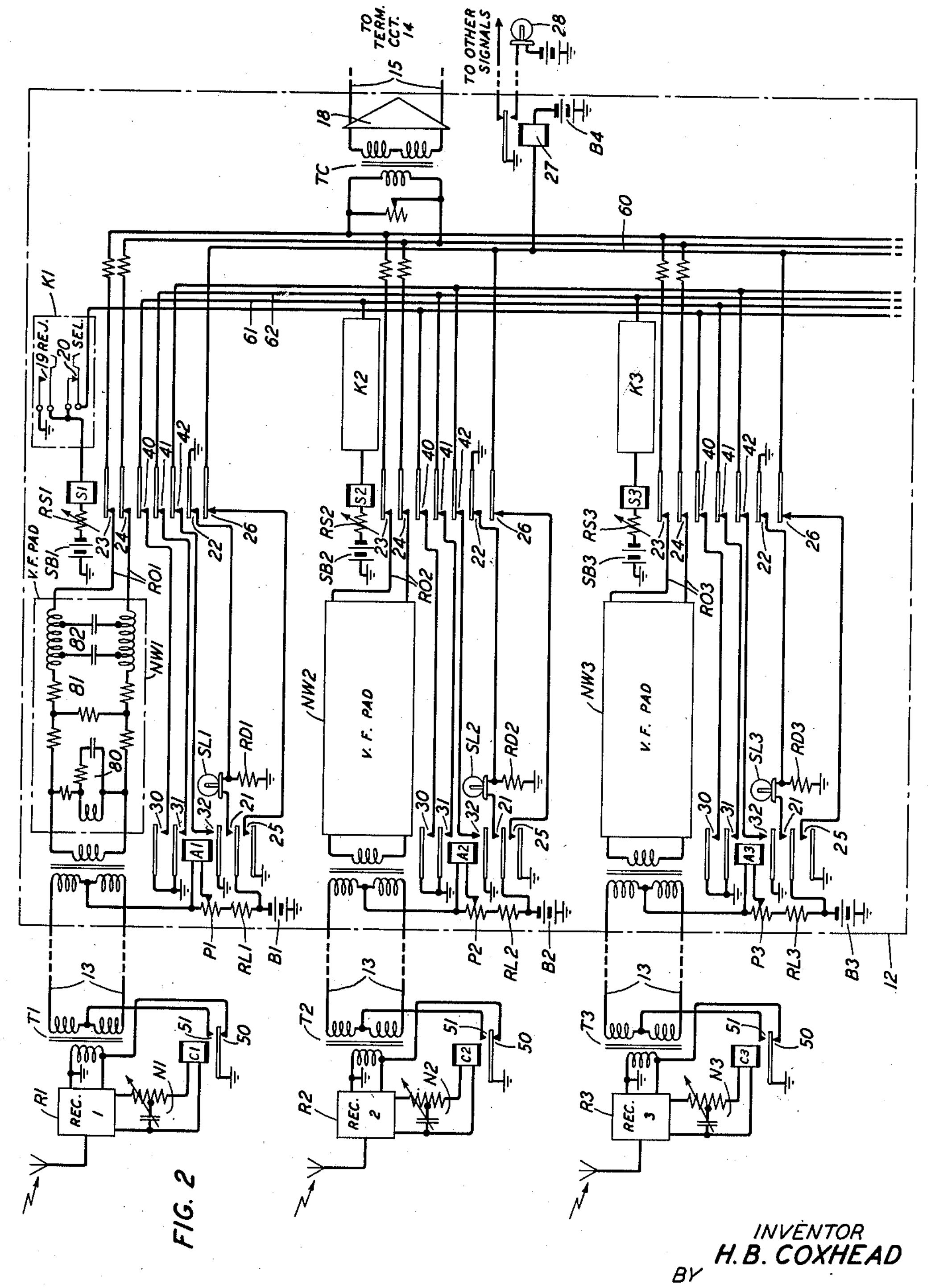

A more complete understanding of this invention, its various features and advantages will be derived from the detailed description that follows, taken in conjunction with the showing of the appended drawing wherein:

Fig. 1 illustrates a radio telephone system in which the invention may be incorporated; and Fig. 2 illustrates various features of the invention as embodied in the diversity receiving circuit portion of the system of Fig. 1.

The purpose of any diversity reception arrangement is to maximize the signal contributions, and to minimize noise transmission penalties, received from a number of individual receivers or other sources as a group. The signal outputs of the sources may be treated and combined, or successively selected, depending on the nature of the variations, exposures to noise and interference, relative merits of whatever utilization means may be available, and operational considerations peculiar to a particular class of service.

In diversity radio reception, the selecting or combining functions may be inserted between the various antenna output circuits and a common portion of a receiver; or each antenna may have its own receiver associated therewith, in which event, the selecting or combining means may be associated with the output circuits of paths for the receivers.

Space diversity receiving arrangements may be of two general classes; in one case, a plurality of antenna systems are receptive to the same transmitted signal, at one common site, but at slightly different positions, that is, at separations of from a fraction of a wavelength up to several wavelengths; and, in the other case, a plurality of antennas and their respective receiver systems are located at geographically different sites and their output circuits brought to a common central control position. For mobile radiotelephone services, the receiving system is of the latter type, where each receiver unit is exposed to ambient noises which are pecular to its site alone, signal intensities vary over extreme limits, and in addition, the receiver unit optimumly responsive to a signal radiated from the mobile station changes at times very rapidly. Certain transmission advantages are obtained and some penalties are experienced in either of the two classes of diversity reception mentioned. The system to be described in detail hereinafter includes aspects of each type, and switching arrangements to furnish any desired arrangement of one or more receivers in combination, or automatic selection between any two or more receivers. The normal arrangement comprises orderly combining of all the receiving circuits until a signal is received to start a selection process. During the brief intervals prior to a selection, the presence of the initial syllables of the signal message with fidelity and advantageous speech or signal-to-noise ratio, avoids initial clipping penalties which otherwise might obtain, especially where the transmission from the mobile station is voice controlled, as is generally the case in ship-to-shore or coastal harbor radiotelephone systems.

With reference to Fig. 1, there is illustrated a radio telephone system in which the present invention may be embodied. This system is shown as comprising a mobile radio station mounted in, for example, a land vehicle, specifically, an automobile 10, and including both receiving and transmitting equipment (not shown) associated with an antenna 11; a plurality of radio receivers R1, R2, R3. . . ; a control terminal 12 into which the outputs of the radio receivers are adapted to be transmitted over suitable transmission lines or paths 13, and at which the outputs of the radio receivers may be combined, or the most satisfactory of the respective outputs selected; and a suitable terminating circuit 14, for example, the toll switchboard of a telephone central office or exchange, into which the combined or selected receiver output is adapted to be transmitted from the control terminal over a suitable line or path 15. A transmitter station 16, which may be located in the same building as, or in the immediate vicinity of, the terminating circuit 14, or at a point remote therefrom but under the control of the operator at the terminating circuit, is provided for outgoing signaling from the terminating circuit to the mobile station 10. The transmitting station may be of high power output compared to that of the transmitter of the mobile station. In a system of this type, transmission from the mobile station might be on one frequency, and each of the fixed-position station receivers adapted to receive signals on that frequency, and transmission out from the station 16 might be on a second high frequency, with the receiver at the mobile station adapted to receive signals on the second frequency. The circuit arrangement at the mobile station may be such that the receiver thereat is continuously energized for the reception of incoming transmission, with the transmitter at the mobile station adapted to be energized by the operation of a suitable switch or pushbutton when it is desired to signal out from the mobile station. This switch or pushbutton may be located in the handle of a hand telephone set including a telephone receiver and microphone at the mobile station, or the switch may be one also providing a support for the handset when the latter is not in use. Unless intentionally or accidentally disabled, each of the fixed-position station receivers would be continuously energized for reception of signals transmitted from the mobile station. Each fixed station receiver preferably is of the type including means suppressing output from the receiver, in the absence of the desired frequency carrier incoming to the receiver, or receiver signal output below an acceptable or minimum signal-to-noise ratio, but operative in response to such minimum or better receiver output signal-to-noise ratio to enable transmission of receiver output to the transmission path or circuit connecting the receiver to the terminal station. Such means may be in the nature of the so-called codan (carrier operated device antinoise) relay well known in the radio receiver art, suppression of receiver output being effected, for example, by a short-circuiting connection across the receiver output transformer; and transmission enabling being effected by the removal of such short-circuiting connection under control of and through appropriate contacts of the codan relay. The receivers R1, R2, R3. . . may be separated or spaced at very short intervals, or a few miles, or at intervals of some tens of miles, or more, as the particular system's requirements may dictate.

With more specific reference to Fig. 2, each receiver R1, R2, R3 . . . is adapted to receive the high frequency signal radiated by the mobile station and to deliver the detected audio frequency component thereof to its associated line 13, for example, through an output transformer T1, T2, T3 . . . , provided the respective relay C1, C2, C3 . . . has operated to open its back or break contact, thereby removing the short circuit across the primary winding of the transformer, and to close its make or front contact to apply ground potential at the midpoint of the transformer secondary winding. Each line 13 is connected with a separate receiver output transmitting circuit RO1, RO2, RO3 . . . , at the control terminal or station 12. Each of such output circuits is normally interconnected, as shown, with the common channel 15 through the coupling transformer TC and an output amplifier 18. Associated with each RO circuit are a pair of multicontact relays and a multiposition key or switch, designated as relays A1, A2, A3 . . . , S1, S2, S3 . . . , and keys K1, K2, K3 . . . ; a visual signal or lamp, designated as SL1, SL2, SL3 . . . ; and a voice frequency pad or network, designated as NW1, NW2, NW3 . . . , in the respective circuits. Each A relay is adapted to be energized or operated upon closure of the make contact at the C relay of the receiver respective to its associated receiver output circuit, from its associated current source or battery, designated B1, B2, B3 . . . over an obvious circuit including the simplex of line 13. Each S relay is adapted to be energized or operated from its associated current source or battery SB1, SB2, SB3 . . . either as a result of such manual adjustment of its associated K key that the open or make contact (designated REJ, for reject) of the latter is closed; or as a result of the operation of an A relay associated with one of the other RO circuits, during an interval in which the A relay of the RO circuit including the particular S relay is in non-operated condition, and the K key associated with the particular S relay is in the condition illustrated with respect to key K1. Each of the keys K1, K2, K3 . . . , shown in detail with respect to key K1, comprises a normally open or make contact spring pair 19 and a normally closed or break contact spring pair 20, the spring pairs being separately adjustable in known manner. Closure of the contact spring pair 19 completes an obvious energizing circuit for the associated S relay, whereas opening of the contact spring pair 20, without closure of the pair 19, interrupts any possible energizing circuit for the associated S relay. Each signal lamp SL1, SL2, SL3, . . . , is adapted to be operated upon closure of an obvious circuit from battery, one contact 21 of the associated A relay and one contact 22 of the associated S relay. Should the S relay associated with a respective receiver output circuit have been energized or operated prior to the operation of the A relay associated with the respective circuit, the contact 22 will be open and the circuit for the SL lamp will be completed through the dimming resistor RD1, RD2, RD3 . . . , whereby the brilliance or intensity of illumination of the signal lamp is less than if contact 22 were closed. The SL lamp is adapted, therefore, to give a visual indication either at reduced or at normal brilliance, at all times that the respective receiver is transmitting signal output to the control terminal, and a visual signal of normal brilliance at such times as the receiver output transmitted to the control terminal from a respective receiver is being further transmitted through the closed line contacts 23, 24 of the associated S relay to the common receiving channel 15. The function of the NW networks will be elaborated upon in subsequent description of the various modes of operation of which the arrangement of Fig. 2 is capable. A current limiting resistor RL1, RL2, RL3, . . . may be included in the respective energizing circuits for the A relays; and the winding of each A relay may be connected across a potentiometer P1, P2, P3, . . . , whereby the response-time of the respective A relays may be relatively adjusted for a particular mode of operation of the circuit. It will be noted that each A relay includes a contact 25 adapted to be closed upon operation of the respective A relay, to complete an energizing circuit, through a contact 26 of the S relay respective to the associated receiver output transmitting circuit, for a relay 27. The latter is adapted upon operation to complete an obvious circuit for a signal lamp 28 located at a switchboard at the terminating circuit 14. Illumination of lamp 28 provides a signal at the switchboard that at least one of the receivers R1, R2, . . . is receiving signal radiated from a mobile station, and that its audio frequency output is connected into the control terminal. Each A relay and each S relay includes auxiliary contacts 30, 31, 32 . . . and 40, 41, 42 . . . , respectively, effective in the receiver output transmitting circuit selecting or excluding functions of these relays, as will be explained in greater detail with respect to the presently to be described modes of operation of the arrangement of Fig. 2.

The diversity receiving arrangement of Fig. 2 may be utilized in different ways. It may function as a selecting circuit to exclude from continued connection with the common channel 15, all receivers R1, R2, R3, . . . except that one which is the first to indicate by operation of its associated A relay, that it is delivering a signal at its output and to the line 13. If it is desired, however, to maintain a particular receiver output transmitting circuit, or circuits, connected with the channel 15 at all times, the selecting operation may be confined to a selection from among the remaining receiver output transmitting circuits, by appropriate manual adjustment of the respective K keys. It may function as a combining circuit to deliver to the common channel 15, the combined outputs of all of the receivers during the intervals that some or all of them have signals of acceptable signal-to-noise ratio available at their outputs. In any event, should an individual receiver require maintenance or repair, or transmission conditions respective to or at a particular receiver or its associated receiver output transmitting circuit dictate its effective disconnection from the circuit for a particular period, such disconnection may be readily and simply effected by manual operation of the appropriate K key. These and other operating features of the disclosed embodiment of the invention will now be described.

*Receiver selection operation*

At the beginning of each transmitting interval from the mobile station 10, high frequency signal energy is radiated in many directions, particularly over paths RP1, RP2, RP3 . . . to the radio receivers R1, R2, R3, . . . The transmission losses in these paths and the presence of radio noise will govern the various amounts of signal power effectively received at the respective antennas of the receivers. These may be of the same order or magnitude or, which is more likely, they may be widely different, depending among other factors, on the over-all length of the paths, intervening obstacles and the height gains of the respective antennas. For the purposes of this description, it is assumed that the receivers R1, R2, R3, . . . , are within range of the transmitter of the mobile station, that their squelch and codan sensitivities have been adjusted for comparable threshold of operation and that they respond to the radiated signal, that is, that their relays C1, C2, C3, . . . energize. Let it be assumed that the relay C1 is first to operate, thereby opening its back contact 50 to remove the short circuit across transformer T1, and closing its front contact 51 to place a ground on the simplex of line 13, to complete an energizing circuit for relay A1 from battery B1, resistor RL1, potentiometer P1 and relay A1, line 13 back to ground through contact 51. In operating, the relay A1 causes its associated contacts 21, 25, 30, 31, 32 to close. In closing, contact 21 completes a circuit for signal lamp SL1 from battery B1, contact 21, lamp SL1, contact 22 of relay S1 back to ground. Lamp SL1 is brilliantly illuminated to evidence to any observers at the control station that receiver R1 is responding to received signal from a mobile station, that its relays C1 and A1 have been operated, and that relay S1 has not been operated. In closing, contact 25 closes an energizing circuit for relay 27 from battery B4, relay 27, conductor 60 common to the receivers R1, R2, R3, . . . , contact 26 of relay S1, contact 25 of relay A1, back to ground. The open front contact of relay 27 is thereby closed to complete an obvious circuit for the signal lamp 28 at the switchboard in the terminating circuit 14, providing a visual indication to the operator thereat that one of the receivers has responded to signal radiated from the mobile station. In closing, contacts 30, 31 . . . of relay A1 complete obvious circuits through contacts 40, 41 . . . of relay S1, conductors 61, 62, . . . and the contact spring pair 20 of keys K2, K3, . . . for the energization of relays S2, S3 . . . from their respective batteries SB2, SB3. . . In operating, relays S2, S3 . . . open their respective associated contacts. In opening, each contact 22 of relays S2, S3 . . . removes the short circuit around resistors RD2, RD3 . . . so that subsequent operation of relays A2, A3 . . . after the prior operation of relay A1, and closure of the contact 25 of relays A2, A3, . . . causes signal lamps SL2, SL3 . . . to be illuminated at lower brilliance or intensity than lamp SL1, indicating at the control terminal that one or some of receivers R2, R3 . . . are responding to signal from the mobile station and also available but momentarily excluded. In opening, contacts 23, 24 of relays S2, S3 . . . disconnect the receivver output circuits RO2, RO3 . . . from across the input to the transformer TC and hence from the common channel 15. The opening of contacts 40 of relays S2, S3 . . . prevents completion of an energizing circuit for the relay S1 (and consequent opening of the circuit RO1 at contacts 23, 24 of relay S1) should either of relays A2, A3 . . . operate subsequent to the operation of relay A1. The contacts 32 associated with the A relays and the contacts 42 associated with the S relays are tokens of the additional contacts that could be under the control of these relays with respect to receivers additional to the three shown in Fig. 2. If either relay A2 or A3 had been the first to operate, the respective circuit RO2 or RO3 would remain connected with the common channel 15, and the other RO circuits be disconnected therefrom through energization of their respective S relays under control of either the relay A2 or A3. It is evident that after one or more of the C relays may have operated, and until one of the A relays is energized that all receivers that may have responded to the signal radiated from the mobile station will be connected through to the common channel 15; and that, only after one A relay has energized to exclude or disconnect the RO circuits with which the other A relays are associated, is only one receiver connected to the line 15. During an interval in which the party at the mobile station may be talking, this arrangement minimizes clipping of the initial syllables of the message, as well as affording the benefits of possibly improved signal in the common line 15 from the temporary combination of the outputs of the more than one receiver that may have responded to the signal incoming from the mobile station. During the receiving interval in which it was assumed that the relay A1 was the first to be energized in response to operation of its respective C relay, reception conditions at receiver R1 may change sufficiently, for example, because of change in location of the mobile station, such that relay C1 is restored to its non-operated condition with subsequent opening at its contact 51 of the energizing circuit for relay A1. This restores the contacts of relay A1 to the open condition shown in the drawing, resulting in restoration of the relays S2, S3 . . . to their non-operated condition, and reconnection of circuits RO2, RO3 . . . with the line 15. Should either of relays A2, A3 . . . be energized at this time, one will take control in the manner outlined above with reference to the selection under control of relay A1, to maintain its respective RO circuit connected with the line 15 and to exclude the other RO circuits from such connection. With cessation of transmission from the mobile station, the C relays at the radio receivers R1, R2, R3, . . ., restore to their non-operated condition pending transmission from the mobile station during a succeeding interval, at which time the selection process described above would again occur, the receiver selected in such successive interval depending upon the C relays that are caused to be operated and the A relay that is first to respond to its respective C relay.

If it should be desired to discriminate among the receivers on a time basis, that is, to favor one receiver should it be among a number of receivers responding during the same interval, or to prefer the receivers in a preassigned order, the response-times of the A relays may be appropriately adjusted by means of the potentiometers P1, P2, P3, . . . , and further control in this respect may be introduced by appropriately adjusting the response-times of the S relay by means of the variable resistors RS1, RS2, RS3, . . . . The resistors RS1, RS2, RS3 . . . may be utilized, if desired, to adjust the response-times of the S relays to the same degree, so that other factors being equal, the S relays have the same response-time characteristics. Suitable networks N1, N2, N3 . . . may be associated with the C relays for desired adjustments in their response-time characteristics.

With respect to the mode of operation just described, only one of the several receivers that might be responding to the signal radiated from the mobile station, is selected for connection to the common line 15. In particular circumstances, it may be desirable or desired that, whenever a particular one of the receivers R1, R2, R3 . . . , is delivering an acceptable output to the line 13, as evidenced by the operation of the respective C relay, that receiver's associated RO circuit shall be connected with the line 15 and the other RO circuits excluded from the line 15 even though one of the latter circuits is already connected with the line 15. This may be accomplished by manual adjustment of the appropriate K key from its normal (automatic selection) position by an attendant or observer at the control terminal. If, for example, a K key is adjusted or operated to a position such that its contact spring pair 20 (SEL, for select) is placed in open condition, the energizing circuit for its respective S relay that might be completed through the appropriate contacts of the A and S relays associated with the other RO circuits, is interrupted. If, for example, the contact spring pair 20 of key K1 were adjusted to open condition, the possible energizing circuits for relay S1 by way of contacts 30, 40, of relays A2, A3 and S2, S3 would be interrupted so that operation of either relay A2 or relay A3 would not be effective to exclude the circuit RO1 from continued connection through contacts 23, 24 of relay S1 with the line 15, even though relay A1 were not operated at the time. Let it be assumed that key K1 has been adjusted as just described, and that, of the various receivers, receiver R2 has responded first to signal radiated from the mobile station, such that the relay C2 operates to remove the short circuit from the receiver R2 output transformer, and to complete the energizing circuit for relay A2 over the simplex of line 13. Energization of relay A2 closes the contacts 30, 31 associated therewith that usually would complete energizing circuits for relays S1, S3 through contacts 40, 41 of relay S2 and the closed contact spring pair 20 of keys K1, K3, for opening of contacts 23, 24 of relays S1, S3 with consequent exclusion of the circuits RO1, RO3 from connection with line 15. Since key K1 has been so adjusted that its possible energizing circuit is interrupted at contact spring pair 20, only circuit RO3 will be so excluded, while circuits RO1 and RO2 remain connected with line 15. Should relay A1 now be energized, closure of its contact 30 completes an obvious energizing circuit for relay S2 through contact 40 of relay S1 and the contact spring pair 20 of key K2, whereby relay S2 energizes and opens its contacts 23, 24 to disconnect circuit RO2 from the line 15; and closure of contact 31 completes an obvious energizing circuit for relay S3 through contact 41 of relay S1 and the contact spring pair 20 of key K3, to replace that interrupted at contact 41 of relay S2 by the latter's energization. Hence circuits RO2, RO3 are thus disconnected or excluded from connection with the line 15, and circuit RO1 remains so connected.

Action similar to that described above takes place when two or more receiving circuits are assigned priority of control by adjustment of as many of the respective keys K to the select position as appears desirable in particular circumstances. Let it be assumed that keys K1 and K2 have been adjusted as just described so as to give automatic priority to receivers R1 and R2 and that all receivers R1, R2, R3 . . . respond to an incoming signal, causing relays C1, C2, C3 . . . and relays A1, A2, A3 . . . to be operated. Receiving output circuits associated with receiver R3 . . . are excluded at RO3 . . . , signal lamps SL3 . . . dimmed, and all control circuits interrelated with contacts on relays S3 . . . are excluded by the operation of relay S3 . . . from circuits held continuous through contacts of relays S1 and S2 and completed through operated contacts of relays A1 and A2. At the same time, receiver output circuits RO1 and RO2 remain closed, signal lamps SL1 and SL2 indicate with normal brilliance, and all control circuits interrelated with the contacts of relays S1 and S2 are made to perform their respective functions in accordance with either or both of receivers R1 and R2. If, during this signal transmission interval or at any succeeding time during periods of assigned priority to receivers R1 and R2, either of this team of receivers should fail to respond to the transmitted signal, the other of the pair maintains control as described above. As long as either or both of the manually selected receivers responds to a transmitted signal, all receivers in the related system, other than R1 and R2, are locked out and the receivers which have been arbitrarily assigned priority perform as a group in combination. In the event that both of the combined operation receivers become non-responsive to the transmitted signal, the remaining receivers, and whose keys K are in normal position, are unlocked and perform selectively as described above for normal receiver selection operations. If, now, one or both of the priority assigned receivers should become responsive, the system control is transferred to the combined group (receivers R1 and R2 in this particular circumstance) as a unit. Hence, a composite arrangement is described which includes receiver selection operation, above, and combined receiver operation, here following.

*Combined receiver operation*

There may be circumstances in which it may be desirable or desired to combine the outputs of all such of the receivers R1, R2, R3 . . . as may be responding at one interval to signal radiated from the mobile station. This may be readily assured with the arrangement of Fig. 2 by adjustment of the contact spring pair 20 in each K key to its open condition. Hence, the outputs of all receivers are connected in combination to the receiving line 15, because operation of the A relay associated with any one of the receiver output transmitting circuits cannot result in the energization of any S relays associated with the other receiver output transmitting circuits with consequent disconnection thereof from line 15. If it is assumed, for example, that all of the receivers R1, R2, R3 . . . are responding to incoming signal, have actuated their respective C and A relays, the receiver outputs transmitted over the lines 13 will be further transmitted through the respective RO circuits to the line 15 through the combining transformer TC and amplifier 18. For a given installation, non-uniformities in the respective transmission paths from the output terminals of receivers R1, R2, R3 . . . to the line 15, may be compensated for or equalized by means of the networks NW1, NW2, NW3 . . . each of which may include frequency-correcting, volume or transmission level, and time-delay sections 80, 81, 82, whereby the combined signal appearing in the line 15 is better than if derived from a random mixture or combining from non-uniform transmission paths. While not essential to the receiver selection operation of the disclosed arrangement, these networks assist in minimizing any noticeable effects of the switching from one receiver circuit to another.

As already referred to hereinabove, each K key includes a contact spring pair 19 adapted to be closed by manual adjustment of the key by an attendant at the control treminal, and thereby to complete an energizing circuit for its respective S relay from the latter's SB battery, RS resistor, S relay winding, back to ground through the contact spring pair 19. Operation of a K key, for example, key K1, in this fashion, results in the opening of the contacts associated with the respective S relay, namely, relay S1, and consequent disconnection at contacts 23, 24 of the associated RO circuit, namely circuit RO1, from the common line 15, the removal of control through contacts 40, 41, 42 by the respective A relay, namely relay A1, of the S relays, namely relay S2, S3 . . ., associated with the other RO circuits, the removal of the shunt around the respective RD resistor, namely, resistor RD1, and interruption of the possible energizing circuit for the relay 27. So long as one or more of the K keys have been adjusted from neutral position to closure of the contact spring pair 19, whatever may be occurring in the excluded circuits associated therewith, such excluded circuits will have no effect on the operation of the system, whether the remaining receiving circuits are arranged for receiver selection operation, combined receiver operation, or a combination of the latter modes of operation.

If, for example, one of the receivers of the receiving system should develop trouble of any kind and thereby cause a permanent illumination of an SL signal lamp, or otherwise take control of the receiving system because of the operation of its associated A relay, the K key enables an attendant at the control terminal to remove such receiver and its associated receiving circuit from the system until the trouble has corrected itself, or while the cause of the difficulty is being determined and corrected. It is evident, also, that the rejection or exclusion feature of the K key may also be taken advantage of to disconnect all but one of the RO circuits from the line 15 so that the receiving system of Fig. 2 will perform as a single receiver terminal with respect to radiated signal from the mobile station, if such a condition is desired.

The arrangement described with specific reference to Fig. 2 may be utilized in a system such as is shown in Fig. 1 in which the transmitter control at, and by the user or subscriber at, the mobile station may be of various types. The most common transmitter control type is that in which transmitter power is supplied from a dynamotor caused to function by operation of a push-to-talk button by the subscriber at the mobile station. In actual practice, the maximum desired voltage builds up relatively slowly (that is, on the order of 200 to 300 milliseconds). During this interval, the radiation from the antenna at the mobile station is smoothly increased to normal output power. Each of the receivers R1, R2, R3 . . . responds to the least power required to cause its squelch and codan relay to operate. A fixed-station receiver that is electrically close to the mobile station will naturally respond early in the power building-up cycle; on the other hand a fixed-station receiver which is on the fringe of the coverage area of the particular mobile station will not respond until the radiated power of the mobile station approaches its normal or final output. Because of this time factor, the response-time adjustments shown for the relays of Fig. 2 would not necessarily be required with such a mobile unit transmitter, since the relays themselves could be relatively fast-acting and the desired selection occur under control of the slow build-up of power radiated from the mobile station transmitter.

On the other hand, the arrangement at the mobile station may be such that removal of the hand telephone set thereat causes the transmitter power supply dynamotor to run continuously while the handset is so removed, operation of the push-to-talk button by the user applying the built-up dynamotor power output instantly. For this situation, the fixed-station receivers should have their squelch circuits adjusted for codan relay operation on the same circuit merit grade of signal. When this requirement is satisfied, the better receivers will have priority in the selection operation. In practice, however, it may be convenient to have the squelch circuit sensitivities quite differently adjusted at the different fixed-station receivers. The networks N1, N2, N3 . . . permit of compensation for differences in squelch circuit sensitivities for a uniform lining up of the receivers from a viewpoint of input signal-to-noise merit versus time of codan relay operation characteristics.

Still another transmitter control arrangement at the mobile station might be one in which removal of the hand telephone set from its hook switch or equivalent switching arrangement, initiates radiation from the transmitter which continues until the handset is restored to its normal or not-in-use position. The first of the receivers R1, R2, R3 . . . to respond will exclude the others. As the mobile station (for example, on a railroad train) approaches the fringe of that receiver's coverage area, another receiver automatically is switched in, provided that more than one receiver is covering that location. Time discrimination action would occur only when the mobile station's dynamotor is started by the removal of the handset from its hook switch. Because of the interrelationship of the various A and S relay circuits in the receiving system, as soon as the receiver-in-control no longer has an operated C relay, an orderly transfer will take place on a random basis, provided another receiver has an operated C relay. If all the receivers are adjusted for minimum usable signal levels and if the receivers are adequately distributed, circuit continuity into the common channel will be maintained without noticeable interruptions.

It will be evident from the above that, with a relatively simple circuit arrangement and a relatively small number of switching components, a wide range of operational possibilities with respect to a plurality of receiving circuits in a diversity receiving system, have been made available by the present invention. Although disclosed with reference to inclusion in a mobile radio-telephone system, obviously the arrangement of Fig. 2 is utilizable wherever diversity signal reception, and either receiver output selection or combined receiver output operation, is required or desired. It will be evident, also, that the selecting, excluding and combining functions of the output transmitting circuit, switching and signaling means located at the control terminal or station could be employed with respect to a plurality of signal sources other than the radio receivers shown in the drawing; and that features of the invention are applicable in other than space diversity systems, namely in frequency or directivity diversity systems. Although separate batteries are shown in Fig. 2 as current sources for the A and S relays, the signal lamps and relay 27, this has been for convenience of showing and description, as it is evident that a common battery, or other current source, could be provided at the control terminal or station.

Although described with reference to a specific embodiment, it is to be understood that the invention is not limited thereto, and that other embodiments of the inventive concepts will readily occur to those skilled in the art.

What is claimed is:

1. A radio receiving system comprising a plurality of radio receivers at different geographical locations and all adapted to receive the same signal, a common signal channel, a signal circuit respective to each receiver and normally connected with said common channel for delivering the receiver signal output into said channel whenever said signal output is of preassigned minimum signal-to-noise ratio, relay means at each receiver responsive to signal output thereat of such ratio, relay means respective to each signal circuit and responsive to operation of said first-mentioned means, additional relay means respective to each signal circuit and normally responsive to operation of the first-to-operate of said second-mentioned relay means in and respective to said other signal circuits for disconnecting its respective signal circuit from said common channel, and key-controlled means respective to each of said additional relay means for maintaining the latter in either of its operated and non-operated conditions whereby its respective signal circuit remains either connected with or disconnected from said common channel regardless of the operating condition of said second-mentioned relay means respective to the other signal circuits; such key-controlled means comprising normally-closed contacts included in the normal operating circuit of its respective additional relay means and normally-opened contacts included in a normally-open operating circuit for such additional relay means independent of such first-mentioned operating circuit, such contacts being arranged for individual opening or closure, respectively, upon manipulation of the key, to open the normal operating circuit of such additional relay means or to close such normally-open operating circuit of such additional relay means.

2. A radio telephone system comprising a plurality of receivers of the same signal disposed at separated geographical locations, a receiver selector station, a receiver output circuit respective to each receiver and connecting with said station, a terminal station, a common receiving channel interconnecting said selector station and said terminal station, a pair only of multi-contact relays respective to each of said receiver output circuits at said selector station, each pair of relays consisting of a first and a second relay and the pair's respective output circuit being connected through contacts of the second relay to said common channel during the normal condition of said circuit, the winding of such second relay being connected to a normally-opened contact of each first relay of the relay pair respective to the other output circuits, energization of one of said first relays prior to any other of said first relays closing the aforementioned normally-opened contacts to energize the connected windings of the second relays respective to the other circuits at said selector station to disconnect said other circuits from said common channel by opening the second relay contacts through which its respective output circuit is normally interconnected with the common channel, and means at each receiver responsive to a preassigned signal condition during signal receiving at said receiver to energize the first relay of the respective output circuits at said selector station.

3. A radio telephone system comprising a plurality of receivers of the same signal disposed at separated geographical locations, a receiver selector station, a receiver output circuit respective to each receiver and connecting with said station, a terminal station, a common receiving channel interconnecting said selector station and said terminal station, a pair only of multi-contact relays respective to each of said receiver output circuits at said selector station, each pair of relays consisting of a first and a second relay and the pair's respective output circuit being connected through contacts of the second relay to said common channel during the normal condition of said circuit, the winding of such second relay being connected to a normally-opened contact of each first relay of the relay pair respective to the other output circuits, energization of one of said first relays prior to any other of said first relays closing the afore-mentioned normally-opened contacts to energize the connected windings of the second relays respective to the other circuits at said selector station to disconnect said other circuits from said common channel by opening the second relay contacts through which its respective output circuit is normally interconnected with the common channel, a visual signal circuit at said selector station respective to each of said output circuits, energization of a first relay only of a respective output circuit lighting the latter's visual signal for one order of visual signal brilliance, and energization of both first and second relays of a respective output circuit lighting the latter's visual signal for a different order of visual signal brilliance whereby the output circuit connected to the common channel is readily distinguished from such other output circuits as may also be transmitting into said selector station, and means at each receiver responsive to a preassigned signal condition during signal receiving at said receiver to energize the first relay of the respective output circuits at said selector station.

4. A radio telephone receiving system comprising a plurality of receivers of the same signal disposed at separated geographical locations, a receiver selector station connected with said receivers, a terminating station, a common receiving channel interconnecting said selector and terminating stations, means at said selector station for interconnecting one only of said receivers at a time to said common circuit, and lamp means at said selector station lighted at one intensity visually indicating which receiver is connected to said common channel, and lighted at a different intensity visually indicating such other of said receivers as are simultaneously transmitting the received signal into said selector station.

5. In combination, a plurality of signal transmission circuits, a common signal channel, and a pair only of multicontact relays respective to each circuit, each pair of relays comprising a first relay responsive to a preassigned signal condition during signal transmission in its respective circuit and a second relay through whose contacts its respective circuit is normally interconnected with said common channel, the winding of each of said second relays being connected to a normally-opened contact of each of the first relays respective the other circuits, energization of one of said first relays prior to any other first relay closing the afore-mentioned normally-opened contacts of such energized relay to close energizing circuits for the second relays respective to the other circuits to disconnect said other circuits from the common channel by opening the second relay contacts through which its respective output circuit is normally interconnected with the common channel.

6. In combination, a plurality of signal transmission circuits, a common signal channel, a pair only of multicontact relays respective to each circuit, each pair of relays consisting of a first and a second relay and the respective circuit being connected normally through contacts of respective ones of said second relays with said common channel, the winding of each of said second relays being connected to a normally-opened contact of the first relay of the pair respective each of the other circuits, energization of one of said first relays prior to any other first relay closing the afore-mentioned normally-opened contacts of such energized relay to close energizing circuits for the second relays respective to the other circuits to disconnect said other circuits from the common channel by opening the second relay contacts through which its respective output circuit is normally interconnected with the common channel, and means respective to each circuit and responsive to a preassigned signal condition during signal transmission in said circuit to energize the first relay of the respective circuit.

7. In combination, a plurality of signal transmission circuits, a common signal channel, relay means respective to each circuit and having normally-closed contacts for interconnecting it with said common channel, other relay means respective to each circuit and operative upon supply of control signal to its respective signal transmission circuit to adjust said first relay means respective to each of the other circuits by opening of said normally-closed contacts for disconnection of each of said other circuits from said common channel, and means respective to each of said first relay means for adjustment of said first relay means for interconnection and disconnection of its respective circuit with respect to said common channel independently of the operation of said other relay means; the means respective each first relay means including contacts manually-adjustable to preclude opening of such normally-closed contacts of such first relay means upon operation of such other relay means and other contacts manually adjustable to adjust the first relay means such that its normally-closed contacts are maintained open regardless of the operating condition of such other relay means.

8. In combination, a plurality of signal transmission circuits, a common signal channel, means for normally interconnecting each of said circuits with said common channel, means for automatically selectively disconnecting certain of said circuits from said channel, and lighted lamp means for visually indicating, during transmission in more than one of said circuits, with one order of lighted lamp intensity which one or ones of said last-mentioned circuits continue interconnected with said common channel and with a different order of lighted lamp intensity which other or others of such last-mentioned circuits are disconnected from the common channel.

HARRY B. COXHEAD.

REFERENCES CITED

The following references are of record in the file of this patent:

UNITED STATES PATENTS

| Number | Name | Date |
|---|---|---|
| 1,747,218 | Bohn | Feb. 18, 1930 |
| 1,763,194 | Sivian | June 10, 1930 |
| 2,190,546 | Laube | Feb. 13, 1940 |
| 2,210,089 | Loughren | Aug. 6, 1940 |
| 2,249,425 | Hansell | July 15, 1941 |
| 2,253,867 | Peterson | Aug. 26, 1941 |
| 2,280,420 | Chappel | Apr. 21, 1942 |
| 2,339,750 | Bartholy | Jan. 25, 1944 |
| 2,433,281 | Lord | Dec. 23, 1947 |
| 2,441,661 | Crosby | May 18, 1948 |